Patented Aug. 27, 1935

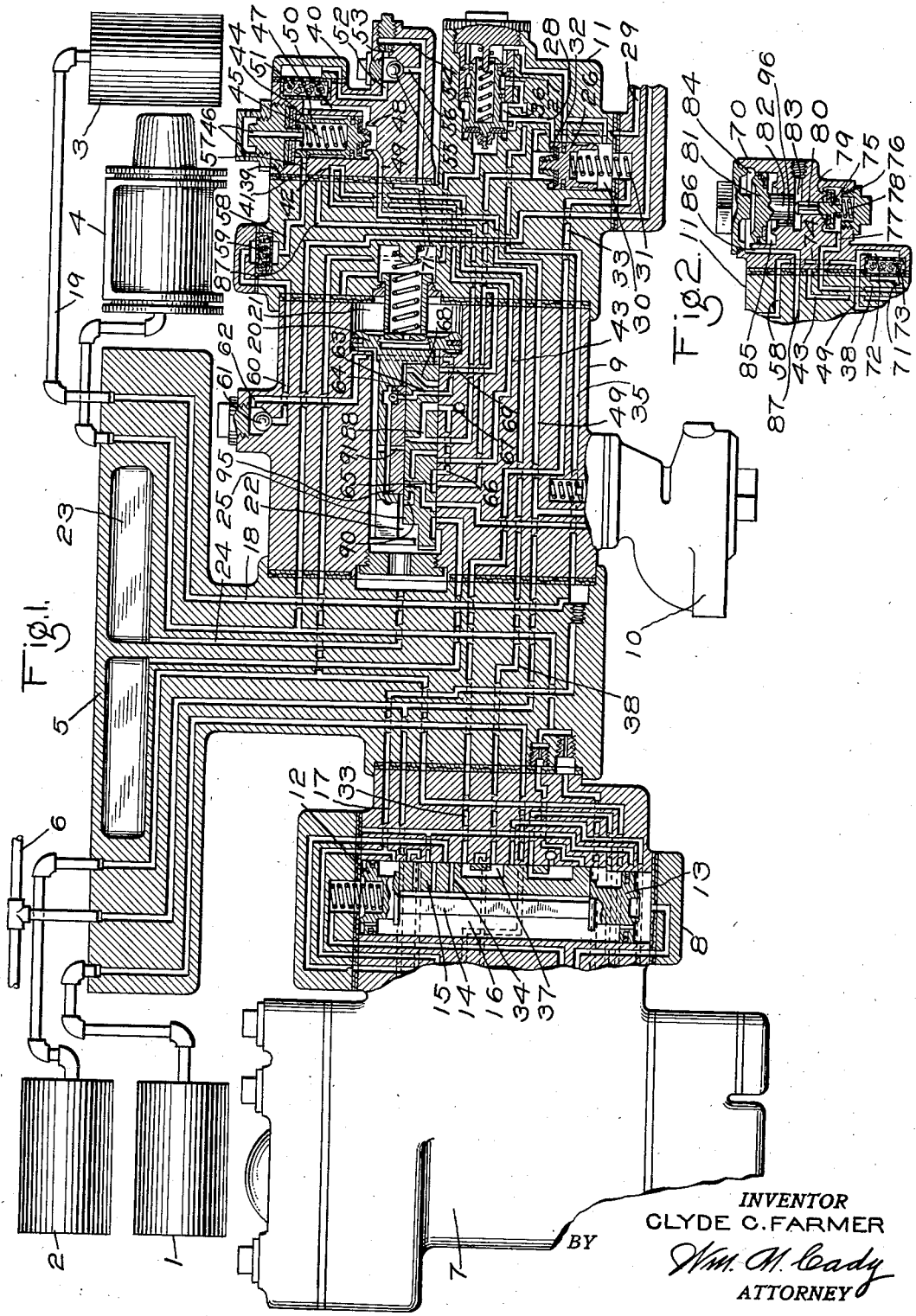

2,012,744

UNITED STATES PATENT OFFICE 2,012,744

FLUID PRESSURE BRAKE

Clyde C. Farmer, Pittsburgh, Pa., assignor to The Westinghouse Air Brake Company, Wilmerding, Pa., a corporation of Pennsylvania Application November 3, 1934, Serial No. 751,297

9 Claims. (Cl. 303—23)

This invention relates to fluid pressure brakes and more particularly to a brake controlling valve mechanism which operates in accordance with variations in brake pipe pressure to control the brakes on a car.

For controlling the brakes on passenger and other cars particularly adapted to operate in relatively short trains at high speed, the well known universal valve is employed, which is provided with a so called protection valve that is operative to effect an emergency reduction in brake pipe pressure and thereby an emergency application of the brakes, in case the brake pipe pressure falls to a predetermined low degree through leakage or otherwise.

At times, a car equipped with a universal valve is hauled in a freight train. In freight service it is often necessary to separate a train, such as at a grade crossing or for switching a car out of the train, and in order to facilitate as rapid handling of the train as possible, it is customary, after effecting a service application of the brakes on the train, to close the brake pipe angle cock at the front of the portion of the train to be temporarily cut off and thereby hold as much fluid under pressure therein as possible, so that when connected up to the front portion of the train again a minimum of time will be required to recharge the brake system and release the brakes and thus condition the train for moving.

In case a car equipped with the universal valve is in the portion of a train cut off and leakage in the brake system reduces the brake pipe pressure to the setting of the protection valve, then the protection valve operates to effect an emergency reduction in brake pipe pressure and thereby an emergency application of the brakes. Then, before the train can be moved, after coupling the sections of the train together, the brake pipe must be completely recharged and the consequent delay in movement of the train is undesired.

While the above difficulty may be overcome by eliminating the protection valve, other difficulties equally as undesirable will be then encountered, as will now be explained.

In the universal valve there is a high pressure valve, which is normally held seated by fluid under pressure from the emergency reservoir acting on one side and which is operative upon venting of fluid under pressure from said side to establish a communication through which fluid under pressure is supplied from the emergency reservoir to the brake cylinder. This venting of fluid from the high pressure valve occurs in effecting an emergency application of the brakes by way of the release valve portion of the universal valve, when said portion is in application position, and from thence through the emergency valve portion in emergency position.

When a car equipped with a universal valve is in a cut off portion of a train, leakage from the brake pipe will act to maintain the service portion, including the release valve portion, in application position, in which the high pressure valve is connected to the seat of the emergency slide valve, so that emergency reservoir pressure acting to seat the high pressure valve also acts on the seating face of the emergency slide valve and will blow said slide valve off its seat if brake pipe pressure, and therefore the pressure in the emergency valve chamber acting to hold said slide valve seated, becomes sufficiently reduced due to brake pipe leakage, i. e., reduced to a pressure lower than that at which the protection valve would operate.

If the emergency slide valve is blow from its seat, it will permit foreign matter to get on said seat and later cause the emergency valve device to fail, it may also permit such a reduction in pressure on the high pressure valve as to permit it to operate to connect the emergency reservoir to the brake cylinder, and further, it may permit sufficient flow of fluid from the emergency valve chamber to effect operation of a brake pipe vent valve device, which forms a part of the universal valve, to initiate an emergency reduction in brake pipe pressure on the cut off portion of the train, all of which operations are undesirable.

The principal object of the invention is to provide an improved universal valve adapted to operate in the usual manner when employed in passenger or other such short train, high speed service, and which is also adapted to operate in freight service without encountering any of the above described difficulties.

The object is accomplished by providing a new, so called, high pressure cap for the emergency portion of the universal valve, from which high pressure cap a device, including a protection valve, may be removed and another device, including a pilot valve device, may be applied in its place, so as to condition the universal valve for use in freight service.

By the use of the pilot valve device, the emergency slide valve is never subjected to the pressure of fluid which acts to normally hold the high pressure valve seated; instead, an additional valve is provided for venting fluid which acts to hold the high pressure valve seated, said additional valve being adapted to be unseated by fluid under pressure supplied from the emergency valve chamber when the emergency valve device operates to effect an emergency application of the brakes. By this construction, the protection valve may be dispensed with when a universal valve is to be employed in freight service and the emergency slide valve will not be blown from its seat even though the brake pipe pressure, and consequently the pressure in the emergency valve chamber, should reduce to atmospheric pressure due to brake pipe leakage.

It has heretofore been proposed to employ a pilot valve device controlled by an emergency valve device for controlling the operation of a high pressure valve, but according to the present invention, there is provided a new high pressure cap for the well known universal valve, such that the protection valve may be employed, or the pilot valve device may be employed according to the service in which the universal valve is to be operated.

In the accompanying drawing, Fig. 1 is a diagrammatic view, mainly in section, of a fluid pressure brake equipment including a universal valve embodying my invention and showing the device applied for conditioning said universal valve for passenger service or the like; and Fig. 2 is a diagrammatic view of a portion of the universal valve shown in Fig. 1, and showing the device applied for conditioning the universal valve for use in freight service.

As shown in the drawing, the fluid pressure brake equipment comprises a universal valve with which is associated the usual auxiliary reservoir 1, service reservoir 2, emergency reservoir 3 and brake cylinder 4.

The universal valve comprises a pipe bracket 5, to which the several reservoirs and the brake cylinder are connected and also to which the usual brake pipe 6 is connected. Mounted on one face of the bracket 5 is the usual service application portion which comprises an equalizing valve device 7 and a release valve device 8 which device in the drawing is shown in the usual application position, while mounted on another face of the bracket 5 is a quick action portion which includes an emergency valve device 9, and a brake pipe vent valve device 10 and high pressure cap 11 carried by said emergency valve device.

The equalizing valve device 7 and the universal valve is adapted to operate upon a service reduction in pressure in brake pipe 6 to effect a service application of the brakes and upon an increase in brake pipe pressure to effect a release of the brakes, the release of the brakes being controlled by the release valve device 8 which is positioned in accordance with the operation of the equalizing valve portion 7.

The release valve device 8 is shown in a position which would be assumed in a cut off portion of a train after having effected a service application of the brakes, said release valve device comprising two spaced pistons 12 and 13 connected by a stem 14 and a slide valve 15 disposed in a chamber 16 formed between said pistons and adapted to be moved by said pistons, the chamber 16 being in constant communication with the emergency reservoir 3 through passages 17 and 18, and pipe 19.

The emergency valve device 9 comprises a piston 20 having at one side a chamber 21 adapted to be connected to the brake pipe 6 and having at the opposite side a valve chamber 22 connected to a quick action chamber 23 through a passage 24 and containing a main slide valve 25 and an auxiliary slide valve 95 adapted to be operated by the piston 20.

The high pressure cap 11 comprises a casing in which there is mounted the usual high pressure valve piston 26 and intercepting valve device 27.

The high pressure valve piston 26 is operative in effecting an emergency application of the brakes to establish communication from a passage 28 to a passage 29, through which passages fluid under pressure is adapted to be supplied to the brake cylinder 4 in the usual manner, the intercepting valve device 27 being provided to control the flow of fluid under pressure to passage 28, first from the service reservoir 2 and then from the emergency reservoir 3, in the usual manner.

The high pressure valve piston 26 has at one side a chamber 30 which contains a spring 31 adapted to urge said valve piston into engagement with a seat rib 32, provided in the casing, for closing communication from passage 28 to passage 29. The chamber 30 is connected by a passage 33 to the seat of the release valve slide valve 15. When the release valve slide valve 15 is in the lower or release position, a port 34 therein registers with passage 33, which permits fluid under pressure to flow from valve chamber 16, and thereby the emergency reservoir 3, to chamber 30 and therein act with spring 31 to hold the high pressure valve piston 26 seated on seat rib 32 against the opposing pressure of fluid from the emergency reservoir 3 acting on the opposite side of said valve piston outside of seat rib 32, the emergency reservoir 3 communicating with said valve piston through pipe 19, passage 18, passage 35, a cavity 36 in the intercepting valve device 27 and passage 28. When the release slide valve 15 is in the application position, as shown in the drawing, passage 33 from the high pressure valve piston chamber 30 is connected through a cavity 37 in said slide valve to a passage 38, which leads to a gasket face 39 provided on the high pressure cap 11.

According to the invention, a device 40, adapted to condition the universal valve for operation in passenger train service, is mounted on the high pressure cap 11 against a gasket 41 disposed on the gasket face 39, as shown in Fig. 1 of the drawing, the device 40 having a cavity 42 adapted to establish communication between passage 38 from the spring side of the high pressure valve 26 to a passage 43 which leads to the seating face of the main emergency slide valve 25, so that the high pressure valve 26 will be controlled by the emergency slide valve 25 in the usual manner.

The usual protection valve piston 44 is mounted to operate in the device 40 and is provided on one side with a chamber 45 which is open to the atmosphere through passages 46. A spring 47 is disposed in chamber 45 and acts to urge the valve piston 44 into engagement with a seat rib 48 for closing communication from a passage 49, leading to brake pipe 6, to a passage 50 which is in constant communication with the emergency piston chamber 21 through a strainer device 51, passage 52, through a restricted port in a choke plug 53 and passage 54. A check valve 55 is disposed in a passage 56 by-passing choke plug 53, said check valve and choke being associated with the protection valve piston 44 in the device 40 to provide standard operation of the universal valve in passenger service or the like.

The passage 50 leads to the top of the protection valve piston 44 and is adapted to be opened to chamber 45 when the protection valve piston 44 is in engagement with seat rib 48, said passage at the top of the protection valve being connected to a passage 57 which leads to a passage 58 in the high pressure cap and from thence through a strainer 59 to the usual charging passage 60 in the casing of the emergency valve device 9.

In operation, when the brake system is charged with fluid under pressure, fluid under pressure from the brake pipe 6 acts in the emergency valve piston chamber 21, being connected thereto through passage 49, past the protection valve piston 44, which is held in its upper position by the pressure of fluid supplied through passage 49, and from thence through passage 50, strainer 51, passage 52, choke plug 53 and passage 54, while the emergency valve chamber 22 and quick action chamber 23 are also charged with fluid under pressure from the brake pipe 6 by way of passages 50, 57 and 58, through strainer 59, passage 60, past a check valve 61, through passage 62, port 63 in the emergency slide valve 25 and port 64 in the auxiliary slide valve 95.

The reservoirs 1, 2 and 3 are charged with fluid under pressure in the usual manner, fluid from the emergency reservoir being supplied through port 34 in the release valve slide valve 15 to passage 33 leading to chamber 30 beneath the high pressure valve piston 26, when the release valve slide valve 15 is in the lower or release position. The pressure of fluid thus supplied to chamber 30 acts in conjunction with spring 31 to hold the valve piston 26 seated on seat rib 32 against emergency reservoir pressure acting on the opposite side of said valve piston outside of said seat rib, as supplied through pipe 19, passages 18 and 35, cavity 36 in the intercepting valve device 27 and passage 28.

If it is desired to effect an emergency application of the brakes, a sudden emergency reduction in pressure is effected in the brake pipe 6, which causes the equalizing valve device 7 and release valve device 8 to operate in the usual manner, the release valve slide valve 15 being shifted to its upper or application position, as shown in Fig. 1 of the drawing, in which position chamber 30, at the lower side of the high pressure valve piston 26, is connected to the seat of the emergency slide valve 25 by way of passage 33, cavity 37 in slide valve 15, passage 38, cavity 42 in device 40 and passage 43, the passage 43 being normally lapped by the emergency slide valve 25.

When an emergency reduction in brake pipe pressure is effected, a corresponding reduction in pressure occurs in the emergency piston chamber 21, past the check valve 55, which permits the pressure of fluid in the emergency valve chamber 22 to shift the emergency piston 20, and thereby the slide valves 25 and 95 outwardly, to emergency position, in which a cavity 65 in the slide valve 25 connects passage 43 from chamber 30 at the spring side of the high pressure valve piston 26 to a passage 66 which leads to an atmospheric vent passage 67. Fluid under pressure is thereby vented from chamber 30 at the lower side of the high pressure valve piston 26, which permits emergency reservoir pressure acting on the opposite side to move said valve piston out of engagement with seat rib 32 and thereby establish the usual communication between passages 28 and 29, through which fluid under pressure is adapted to be supplied from the service reservoir 2 and emergency reservoir 3 to the brake cylinder.

In emergency position of the main slide valve 25, a port 68 in said slide valve registers with a passage 69 which leads to the side of the high pressure valve piston 26, within the seat rib 32, to which passage 29 is also connected, so that as fluid under pressure is supplied to the brake cylinder through passage 29, fluid at the same pressure also flows into the emergency valve chamber 22 and thereby insures that the emergency valve device will remain in emergency position and also acts to maintain the emergency slide valve 25 seated.

If, instead of effecting an emergency application of the brakes by initiating the sudden reduction in pressure in brake pipe 6 in the usual manner, the brake pipe pressure becomes reduced due to leakage to such a degree that spring 47, acting on the protection valve piston 44, is enabled to overcome the opposing brake pipe pressure, then said spring moves said valve piston toward the seat rib 48 and thereby establishes the communication between passage 50 and chamber 45 which is open to the atmosphere through passage 46, and through this communication fluid under pressure is suddenly vented from the emergency valve piston chamber 21 by way of check valve 55, thereby causing operation of the emergency valve device 9 and high pressure valve piston 26 in the same manner as hereinbefore described.

If the pressure in the emergency piston chamber 21 should be reduced by leakage from the brake pipe, it will be noted that the pressure in valve chamber 22 may, in case of leakage past the emergency piston 20, reduce as the brake pipe pressure reduces, or if the leakage past piston 20 is not great enough to reduce the pressure in chamber 22 as rapidly as brake pipe pressure is reduced, a differential of pressures will be obtained on said piston to move it towards the usual service position until a sufficient registration between port 91 in the auxiliary slide valve 95 and port 88 in the main slide valve 25 is obtained to permit the pressure in said chamber to reduce, by flow through said ports and the atmospheric exhaust port 67, at the same rate as brake pipe pressure is being reduced. However, when the pressure in the brake pipe, and consequently that in the emergency valve chamber 22, becomes reduced to the setting of the protection valve 44, said protection valve will operate to effect an emergency reduction in brake pipe pressure and thereby cause the emergency valve device 9 to operate as above described.

The above operation of the universal valve with the valve device 40 applied to the high pressure cap 11, is the usual or standard operation which is desired for use in controlling passenger or other relatively short high speed trains, it being noted that the protection valve 44 acts in the usual manner to protect against brake pipe pipe pressure becoming reduced, due to leakage or otherwise, to such a degree that an effective application of the brakes cannot be obtained, and with this construction the pressure of fluid acting in chamber 30 to hold the high pressure valve piston 26 seated, is permitted to act on the seating face of the main slide valve 25 without danger of blowing said slide valve from its seat, since the pressure in the emergency valve chamber 22 cannot become reduced, due to leakage or otherwise, to a degree lower than that at which the protection valve 44 operates to vent the brake pipe, since in emergency position of the emergency slide valve 25 the valve chamber 22 is charged to brake cylinder pressure, as hereinbefore described.

If it is desired to operate the universal valve in freight service in which it is not desired to use the protection valve 44, then the device 40 is removed from the high pressure cap 11 and device 70 is applied in its place, as shown in Fig. 2 of the drawing.

The device 70 is provided with a passage 72 which includes a strainer 73 and which establishes a direct communication from the brake pipe passage 49 to passage 71 that leads to the emergency piston chamber 21, it being noted that the choke plug 53 and check valve 55 provided in the device 40 in Fig. 1, are not provided in the device 70, since said choke plug and check valve are required only where the protection valve 44 is employed.

The device 70 is also provided with a passage 74 connected to passage 72 and leading to passage 58 in the high pressure cap 11, through which communication the emergency valve chamber 22 and quick action chamber 23 are adapted to be charged with fluid under pressure from the brake pipe as will be evident.

The device 70 includes a pilot valve 75 contained in a chamber 76 which is connected by a passage 77 to passage 38 in the high pressure cap 11, the passage 38 leading to chamber 30 at the spring side of the high pressure valve. The passage 43, to which passage 38 is connected in the device 40, is lapped by the device 70, so it will be evident that the pressure in chamber 30 acting to seat the high pressure valve 26, will not act on the seating face of the emergency slide valve 25, as is the case in the construction shown in Fig. 1.

A spring 78 is disposed in chamber 76 and acts to urge the pilot valve 75 into engagement with a seat rib 79 which surrounds a bore in the casing through which the fluted stem 80 of the pilot valve extends.

A piston 81 is provided with a stem 82 adapted to engage the pilot valve stem 80, said piston having at one side a chamber 84 and at the opposite side a chamber 85 in constant communication with the atmosphere through a port 96 and an atmospheric chamber 83. The chamber 84 is connected to a passage 86 which leads to a passage 87 in the high pressure cap 11 and extends through said high pressure cap to the seat of the emergency slide valve 25, it being noted that when the device 40 is applied to the high pressure cap 11 the passage 87 is lapped by said device.

The operation of the universal valve with the device 70 applied to the high pressure cap 11 is as follows:

When the brake system is charged with fluid under pressure and the devices are in their normal or release positions, the pilot valve piston chamber 84 is vented to the atmosphere through passages 86 and 87, a cavity 88 in the emergency slide valve 25 and the atmospheric passage 67, and when in effecting an application of the brakes, due to either a service reduction in brake pipe pressure or a reduction caused by brake pipe leakage, the release valve slide valve 15 is in the position shown in Fig. 1, the chamber 30 at the lower side of the high pressure valve 26 is connected to the pilot valve chamber 76 through passage 33, cavity 37 in the release valve slide valve 15 and passages 38 and 77.

In effecting an emergency application of the brakes, the emergency piston 20 and slide valves 25 and 95 move to emergency position in which a port 90 in the slide valve 25 registers with passage 87, which permits fluid under pressure to flow from the emergency valve chamber 22 through port 90 and passages 87 and 86 to the pilot valve piston chamber 84.

The pressure of fluid thus supplied to chamber 84 actuates the pilot valve piston 81 to unseat the pilot valve 75, which vents fluid under pressure from chamber 30 at the spring side of the high pressure valve piston 26 by way of passage 33, cavity 37 in the release valve slide valve 15, passages 38 and 77, pilot valve chamber 76, past the pilot valve 75 and stem 80, and from thence to the atmosphere through the atmospheric chamber 83. Upon thus venting fluid under pressure from chamber 30, the high pressure valve piston 26 is operated to open the communication through which fluid under pressure is adapted to be supplied to the brake cylinder 4, as hereinbefore described.

By the use of the device 70, it will be noted that the pressure which acts in chamber 30 to seat the high pressure valve piston 26 does not act on the seating face of the emergency slide valve 25 at any time, so that there is no danger that the emergency slide valve 25 will be blown from its seat by said pressure in case the pressure in the brake pipe, and consequently in the emergency valve chamber 22, reduces to a low degree due to brake pipe leakage when the protection valve 44 is not employed and the device 70 is applied, as shown in Fig. 2.

It will now be noted, that the universal valve construction employing the device 40, as shown in Fig. 1 of the drawing, provides for standard operation for passenger or other relatively short high speed service, while with the device 70 employed in place of the device 40, the universal valve is conditioned for operation in freight service.

Since the operation of the universal valve is so well known, the above description of the operation thereof has been limited to only those parts which it is deemed necessary to a full and complete understanding of the invention.

While one illustrative embodiment of my invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, a casing containing an emergency valve device operable upon a reduction in brake pipe pressure for effecting an emergency application of the brakes and including a slide valve, said casing having a passage leading to the seat of the slide valve, a high pressure controlling valve device operable upon a reduction in fluid pressure effected through said passage upon movement of said slide valve, a removable member applied to said casing for blanking said passage, and means in said member operable by fluid under pressure for reducing the fluid pressure on said high pressure controlling valve device.

2. In a fluid pressure brake, in combination, a brake pipe, a casing containing an emergency valve device operable upon a reduction in brake pipe pressure for effecting an emergency application of the brakes and including a slide valve, said casing having a passage leading to the seat of the slide valve, a high pressure controlling valve device operable upon a reduction in fluid pressure effected through said passage upon movement of said slide valve, a removable member applied to said casing for blanking said passage, and means in said member including a valve operable to reduce the fluid pressure on said high pressure controlling valve device, and a piston operated by fluid under pressure upon movement of said slide valve for effecting the operation of said valve.

3. In a fluid pressure brake, in combination, a brake pipe, a casing containing an emergency valve device operable upon a reduction in brake pipe pressure for effecting an emergency application of the brakes and including a slide valve, said casing having a passage leading to the seat of the slide valve, a high pressure controlling valve device operable upon a reduction in fluid pressure effected through said passage upon movement of said slide valve, a removable member applied to said casing for blanking said passage, and for establishing a direct communication between said brake pipe and emergency valve device, and other means in said member operable by fluid under pressure supplied by said emergency valve device for reducing the fluid pressure on said high pressure controlling valve device when said emergency valve device is operated upon a reduction in brake pipe pressure.

4. In a fluid pressure brake, in combination, a brake pipe, a casing containing an emergency valve device operable upon a reduction in pressure for effecting an emergency application of the brakes and including a slide valve, said casing having a passage leading to the seat of said slide valve and normally lapped by said slide valve, a high pressure controlling valve device operable upon a reduction in fluid pressure effected through said passage upon movement of said slide valve, a removable member applied to said casing for establishing communication from said high pressure controlling valve device to said passage, and means in said member operable when the pressure in said brake pipe is less than a chosen degree to effect said reduction in pressure on said emergency valve device.

5. In a fluid pressure brake, in combination, a brake pipe, a casing containing an emergency valve device operable upon a reduction in pressure for effecting an emergency application of the brakes and including a slide valve, said casing having a passage leading to the seat of said slide valve and normally lapped by said slide valve, a high pressure controlling valve device operable upon a reduction in fluid pressure effected through said passage upon movement of said slide valve, a removable member applied to said casing for establishing one communication from said high pressure controlling valve device to said passage and another communication between said brake pipe and emergency valve device, means in the last mentioned communication for restricting flow of fluid in the direction from the brake pipe to said emergency valve device and for permitting more rapid flow in the opposite direction, and a protection valve in said removable member for controlling the last mentioned communication and operable when the brake pipe pressure is less than a chosen degree to close communication from said brake pipe to said emergency valve device and to open communication from said emergency valve device to the atmosphere and thereby effect said reduction in pressure on said emergency valve device.

6. In a fluid pressure brake, the combination with a brake pipe and a casing, of valve means disposed in said casing operative upon a reduction in fluid pressure to establish a communication through which an application of the brakes is adapted to be effected, a valve operative upon a reduction in brake pipe pressure for effecting a reduction in pressure on said valve means, a device adapted to be removably mounted on said casing for establishing communication from said valve means to said valve through which said reduction in pressure is adapted to be effected by said valve, and another device adapted to be removably mounted on said casing in place of the first mentioned device and adapted to close said communication and establish another communication to said valve means, said other device comprising fluid pressure actuated means for opening the last mentioned communication to the atmosphere, said valve being operative upon a reduction in brake pipe pressure for supplying fluid under pressure for effecting the operation of said fluid pressure actuated means.

7. In a fluid pressure brake, the combination with a brake pipe and a casing, of valve means disposed in said casing operative upon a reduction in fluid pressure to establish a communication through which an application of the brakes is adapted to be effected, a valve movable upon a reduction in brake pipe pressure to a position for effecting the operation of said valve means, a device adapted to be removably mounted on said casing for establishing a communication from said valve means to said valve, said valve in said position opening the last mentioned communication to the atmosphere for effecting the reduction in fluid pressure on said valve means, and another device adapted to be removably mounted on said casing in place of the first mentioned device and adapted to close the communication from said valve means to said valve, said other device comprising a valve device operative by fluid under pressure for effecting a reduction in fluid pressure on said valve means, said valve being operative in said position to supply fluid under pressure for effecting the operation of said valve device.

8. In a fluid pressure brake, the combination with a brake pipe and a casing, of valve means disposed in said casing operative upon a reduction in fluid pressure to effect an application of brakes, a valve controlled by the opposing pressures of fluid in the brake pipe and a chamber and movable by the pressure of fluid in said chamber upon a reduction in brake pipe pressure to a position for establishing a communication from said valve means through which said reduction in fluid pressure on said valve means is adapted to be effected, a device adapted to be removably mounted on said casing for closing said communication and for establishing another communication to said valve means, and fluid pressure actuated means in said device operative to effect a reduction in pressure on said valve means through the last mentioned communication, said valve being operative in said position to supply fluid under pressure from said chamber to said fluid pressure actuated means for effecting the operation thereof.

9. In a fluid pressure brake, the combination with a brake pipe, of an emergency valve device controlled by the opposing pressures of the brake pipe and a valve chamber and movable to an emergency position upon a reduction in brake pipe pressure, a cap adapted to be carried by said emergency valve device, a high pressure valve disposed in said cap and operative upon a reduction in fluid pressure to effect an application of the brakes, a device adapted to be removably applied to said cap for conditioning the emergency valve device in emergency position for reducing the fluid pressure on said high pressure valve, and another device adapted to be removably applied to said cap in place of the first mentioned device, and means in said other device operative by fluid under pressure to effect said reduction in fluid pressure on said high pressure valve, said emergency valve in emergency position being adapted to supply fluid under pressure to effect the operation of said means.

CLYDE C. FARMER.